US006877791B2

(12) United States Patent
Greuel et al.

(10) Patent No.: US 6,877,791 B2
(45) Date of Patent: Apr. 12, 2005

(54) DEVICE FOR AUTOMATICALLY ACTUATING A VEHICLE DOOR

(75) Inventors: Ingo Greuel, München (DE); Dietmar Orth, Karlsfeld (DE); Holger Schiffer, Meerbusch (DE); Bernd Ulbricht, Markt Indersdorf (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 0 days.

(21) Appl. No.: 10/473,859

(22) PCT Filed: Apr. 9, 2002

(86) PCT No.: PCT/EP02/03897

§ 371 (c)(1),
(2), (4) Date: Oct. 3, 2003

(87) PCT Pub. No.: WO02/084061

PCT Pub. Date: Oct. 24, 2002

(65) Prior Publication Data

US 2004/0113456 A1 Jun. 17, 2004

(30) Foreign Application Priority Data

Apr. 10, 2001 (DE) ........................................ 101 17 933

(51) Int. Cl.$^7$ .................................................. B60J 5/00
(52) U.S. Cl. .................... 296/146.4; 296/56; 296/146.1
(58) Field of Search ......................... 296/146.4, 100.06, 296/146.1, 146.8, 223, 37.16, 50, 56, 57.1, 76, 55; 49/280, 360, 735, 341, 343, 340; 298/23 M, 23 MD; 340/5.72; 292/DIG. 29, 262

(56) References Cited

U.S. PATENT DOCUMENTS 5,588,258 A * 12/1996 Wright et al. ................. 49/340
5,986,420 A * 11/1999 Kato ............................. 49/32
6,137,249 A * 10/2000 Butler et al. .................. 296/56
6,185,868 B1 2/2001 Kato
6,367,199 B2 * 4/2002 Sedlak et al. ................. 296/56
6,398,288 B1 * 6/2002 Yuge ....................... 296/146.4
6,405,486 B1 * 6/2002 Rogers et al. ........... 296/146.1
6,425,205 B2 * 7/2002 Wygle et al. ................. 296/56
6,513,859 B2 * 2/2003 Yuge ....................... 296/146.4
6,516,567 B1 * 2/2003 Stone et al. .................. 296/55
6,520,557 B2 * 2/2003 Benthaus et al. ........ 296/146.4
6,533,342 B2 * 3/2003 Auer et al. ................... 296/76
6,557,924 B2 * 5/2003 Lauderbach et al. ..... 296/146.4
6,601,903 B2 * 8/2003 Nakagome ................... 296/76
6,637,157 B1 * 10/2003 Dombrowski et al. ........ 49/341
6,676,190 B2 * 1/2004 Daniels et al. ........... 296/146.4
6,767,048 B2 * 7/2004 Yokota .................... 296/146.4
2001/0035725 A1 * 11/2001 Mintgen et al. ............ 318/445
2004/0046401 A1 * 3/2004 Watanabe ................... 292/262
2004/0046418 A1 * 3/2004 Chikata et al. .......... 296/146.4
2004/0090083 A1 * 5/2004 Greuel et al. ............ 296/146.4
2004/0097318 A1 * 5/2004 Greuel et al. ............... 475/149

FOREIGN PATENT DOCUMENTS

DE 199 27 871 A1 11/1999
DE 199 11 592 A1 9/2000

* cited by examiner

*Primary Examiner*—Kiran Patel
(74) *Attorney, Agent, or Firm*—Liniak, Berenato & White

(57) ABSTRACT

A device for automatically actuating a vehicle door (1), in particular a side door or a tailgate of the motor vehicle, including: A control device (12) and a drive (4;4') having a motor (5) with a gearing (6) connected downstream and at least one transmission element (8;20) located between the gearing 6 (6) and the vehicle door (1). The invention facilitates the manual actuation of an automatically actuated vehicle door (1) that is in an open position. To achieve this, a load sensor (10) is mounted on the drive (4). When a predetermined load on the open vehicle door (1) has been reached, the sensor generates a control signal, which is fed to the control device (12) for activating the motor (5), or for decoupling a coupling (18) that is located between the gearing (6) and the transmission element (8;20), the load on the open vehicle door (1) being produced e.g. by a corresponding manual pressure on the vehicle door (1).

6 Claims, 4 Drawing Sheets

DEVICE FOR AUTOMATICALLY ACTUATING A VEHICLE DOOR

The invention relates to a device for automatically actuating a vehicle door according to the features of the pre-characterizing clause of claim 1. In this application, the term "vehicle door" is understood quite generally to mean a pivotable part for closing a vehicle opening. The vehicle door may therefore involve either a side door a tailgate or else the lid for closing the engine compartment or the flap for closing a roof opening in a corresponding vehicle.

Motor vehicles having automatically actuable tailgates have already been proposed. In these cases, the tailgate is closed or opened by, for example, the vehicle driver by means of a corresponding actuation of a switch provided in the instrument panel or by means of remote control. For this purpose, the switching signal produced by the switch or the remote control acts on an electronic control device which, for its part, produces electric control signals for activating an electric motor which then, for its part, uses a gear assembly connected downstream and further transmission elements to pivot the tailgate.

Among the disadvantages of these known vehicles is that the particular vehicle door can be actuated automatically only from the inside of the vehicle or via the remote control. Manual actuation, for example, of the tailgate by a person offering assistance who does not have a remote control or a vehicle key is generally not possible.

The invention is based on the object of specifying a motor vehicle having an automatically actuable vehicle door, in which a vehicle door which is in its open position can be actuated manually in a simple manner.

This object is achieved according to the invention by the features of claim 1. Further particularly advantageous refinements of the invention are disclosed by the subclaims.

The invention is essentially based on the concept of arranging a load sensor on the drive, preferably on one of the transmission elements of the drive, said sensor, at a predetermined loading of the open vehicle door, producing a control signal which is then fed to the control device for further processing. In this case, the loading of the open vehicle door takes place, for example, by means of a corresponding manual pressure on the door or on the tailgate, etc.

In a first embodiment of the invention, the motor is connected to the control device, so that, after a control signal is produced by the load sensor, the control device activates the motor and the vehicle door is automatically closed by the latter.

In a second embodiment of the invention, at least one of the transmission elements is designed as a coupling which is operatively connected to the control device, so that, after a control signal is produced by the load sensor, the gear assembly is decoupled from the transmission elements on the vehicle door side and the vehicle door can be closed manually.

If the drive comprises a brake which ensures that the vehicle door is held securely in its predetermined open position, upon loading of the sensor the control device also has to produce a signal for releasing this brake.

In a further embodiment of the invention, the drive comprises a spindle drive, a rotation of the spindle brought about by the motor causing an axial displacement of the associated spindle nut which, for its part, uses a transmission element to bring about a pivoting of at least one of the hinge straps of the vehicle door. In this case, the force sensor is fastened in turn to the transmission element.

The motor may preferably be an electric motor and the control device may be an electric or electronic control device. However, it is also possible to equip the vehicle according to the invention with a hydraulic drive and to use a corresponding control device configured for a drive of this type.

Both force sensors and torque sensors may be used as the load sensors, depending on the design of the drive, said sensors being, for example, piezo sensors or optical deformation sensors. In this case, the sensor should advantageously be arranged close to the particular hinge of the vehicle door where either direct forces and moments are in action owing to the action on the door or corresponding reaction forces or moments occur.

It has proven particularly advantageous if, in the case of a tailgate, the drive and the control device are combined in a pre-assemblable module which can then be inserted, during the assembly of the vehicle, into a corresponding receptacle in the roof support region and fastened.

Further details and advantages of the invention emerge from the following exemplary embodiments which are explained with reference to figures, in which.

Figure 1:
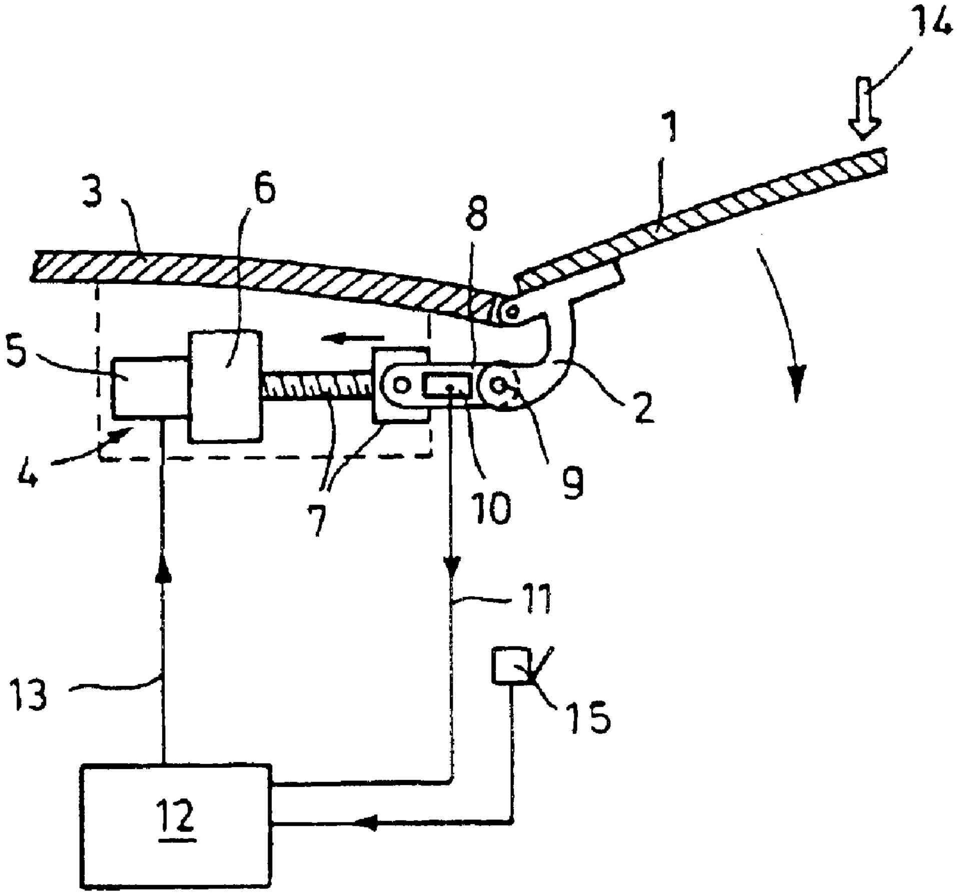
FIG. 1 shows a schematically illustrated side view of the tailgate of a motor vehicle with a drive for opening and closing the tailgate and an electronic switching device for activating an electric motor of the drive.

In FIG. 1, 1 indicates the tailgate of a motor vehicle which is arranged with a roof support 3 of the corresponding vehicle in a manner such that it can be pivoted via hinge straps 2. The tailgate 1 is in its open position.

The hinge strap 2 is connected to a drive 4 which is fastened to the roof support 3. In this case, the drive 4 comprises an electric motor 5, a gear assembly 6 connected downstream of the latter, a spindle drive 7 connected to the gear assembly 6, and a further transmission element 8. The transmission element 8 is connected to the hinge strap 2 in a manner such that it can pivot about an axis 9 running perpendicular with respect to the plane of the drawing.

Furthermore, an extension sensor 10 is fastened as force sensor to the transmission element 8, the output of which sensor is connected via an electric line 11 to an electronic control device 12. In addition, the control device 12 is connected via a corresponding electric line 13 to the electric motor 5 and brings about the switching-on thereof and, if appropriate, also the stipulation of the direction of rotation.

If the tailgate 1 is to be closed, it is initially pressed manually somewhat in the direction of the arrow indicated by 14. The force sensor 10 produces a corresponding signal which is fed via the line 11 to the control device 12. The latter compares the signal with a predetermined desired value and, if the desired value is exceeded, produces a release signal which initiates an activation of the electric motor 5. The tailgate 1 is then automatically pivoted into its closed position via the gear assembly 6, the spindle drive 7 and the transmission element 8.

As soon as the tailgate 1 has reached its closed position, a switch 15 which is connected to the control device 12 causes the electric motor 5 to be switched off.

Figure 2:
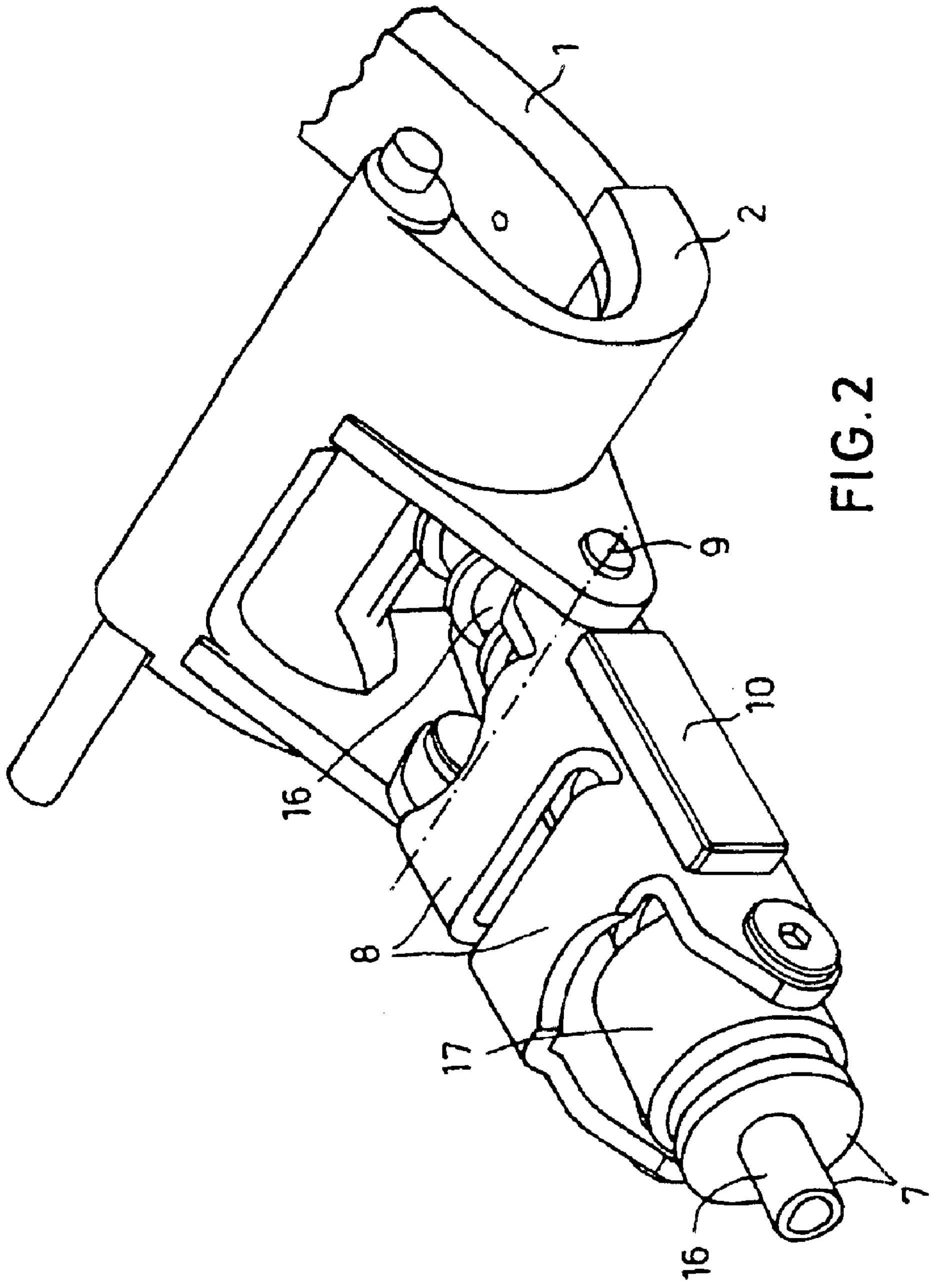
FIG. 2 shows a perspective view of a part of the drive illustrated in FIG. 1 for pivoting the hinge strap of the tailgate of a motor vehicle.

FIG. 2 reproduces a practical exemplary embodiment of a part of the drive 4 which is illustrated in FIG. 1. In this case, the drive again comprises an electric motor (not illustrated) with a gear assembly (likewise not illustrated) which is connected downstream and acts on the spindle drive 7. The spindle drive 7 comprises a spindle 16 which can be rotated by the electric motor or the gear assembly, and a spindle nut 17 which is axially displaced upon rotation of the spindle 16. The spindle nut 17 is connected with the hinge strap 2 of the tailgate 1 via the transmission element 8, the force sensor 10, which is designed as a strain gage, being fastened laterally to the transmission element 8.

Figure 3:
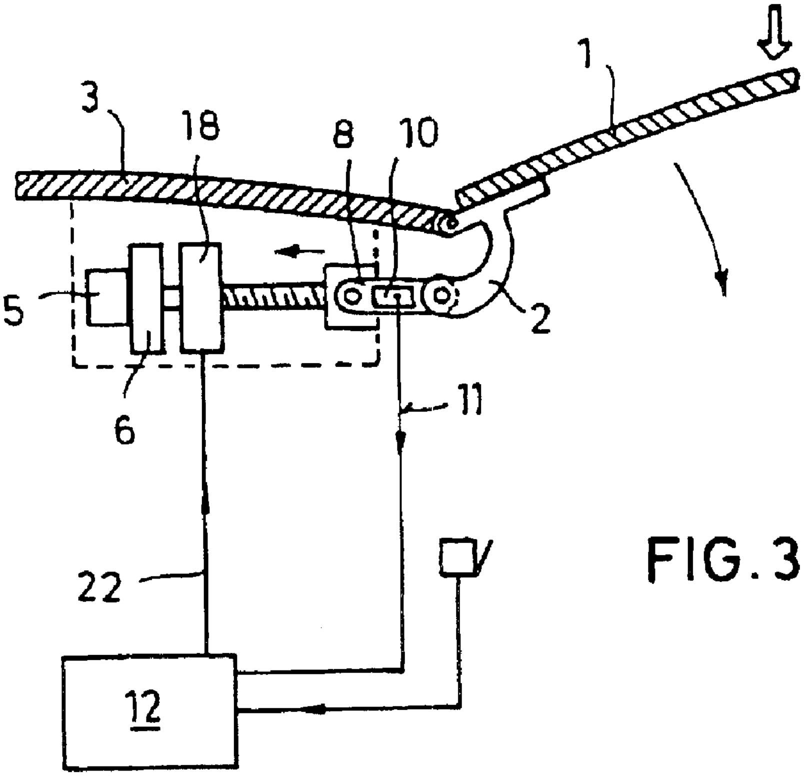
FIG. 3 shows an illustration corresponding to FIG. 1 with an electronic switching device for activating a coupling.

In the exemplary embodiment illustrated in FIG. 3, the release signal produced by the control device 12 does not act on the electric motor 5, but rather on an electromagnetic coupling 18 which is arranged between the gear assembly 6 and the spindle drive 7. In this case, if pressure is applied to the tailgate 1, the tailgate 1 is therefore not automatically closed, but rather the gear assembly 6 is decoupled from the further transmission elements, with the result that the tailgate 1 can be closed manually without this operation being impeded by the gear assembly 6 or the electric motor 5.

Figure 4:
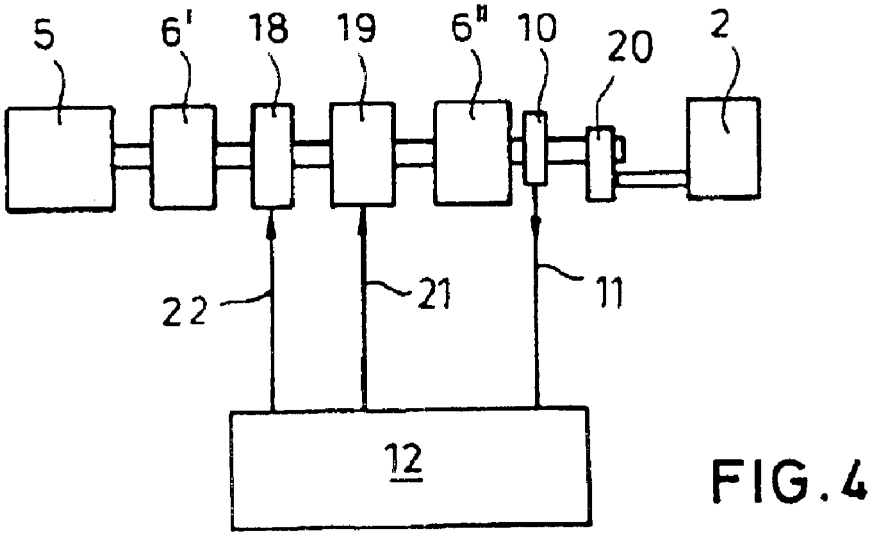
FIG. 4 shows a schematic illustration of a drive which comprises a brake and a torque sensor.

FIG. 4 illustrates a further drive which again comprises an electric motor 5 which is connected to a first gear assembly 6' acting on a coupling 18. The coupling 18 is, for its part, connected via a brake 19 to a second gear assembly 6" which acts via a torque sensor 10 on a crank lever 20 which pivots the hinge strap 2. In this case, the brake 19 is used for fixing the hinge strap 2 and therefore also the vehicle door (not illustrated) in a certain pivoted position.

The sensor signals of the torque sensor 10 pass via the line 11 to the control device 12 (FIGS. 1 and 3), and the signals for releasing the brake 19 and the coupling 18 are transmitted via the lines 21 and 22 in order to permit manual actuation of the vehicle door.

The arrangement of the above-described elements of the drive illustrated in FIG. 4 may, of course, also be varied. However, the sensor 10 should be arranged as close as possible to the hinge 2 where either direct forces and moments occur due to the action on the vehicle door or corresponding reaction forces or moments occur. For determining direct forces, it is recommended to arrange the sensor 10, for example, on the spindle, the spindle nut, the transmission element, the crank lever, the hinge strap, the vehicle door, etc. In order to measure moments, the sensor 10 may be arranged on the drive shaft, the gearwheels of the gear assembly or on the coupling.

Figure 5:
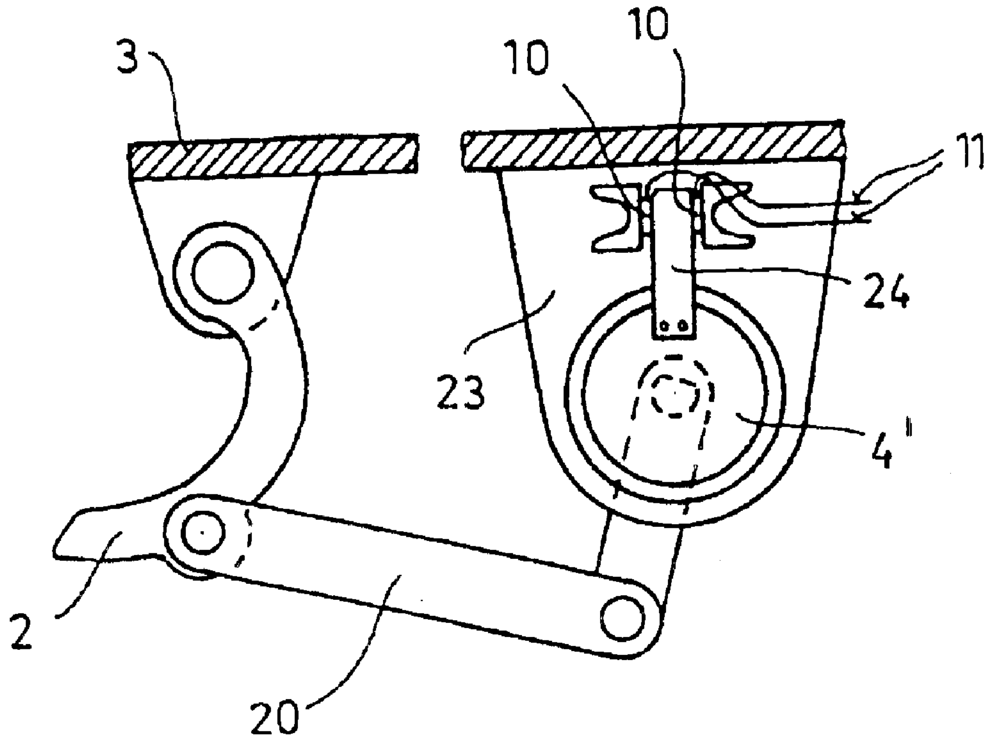
FIG. 5 shows a schematic view from the left side of the drive illustrated in FIG. 4, in which, instead of a torque sensors two pressure sensors for measuring reaction moments are provided.

FIG. 5 shows an exemplary embodiment in which the complete drive, which is referred to by 4', is mounted pivotably in a support 23. On the drive 4' there is at least one torque converter bearing 24 which acts on two opposite pressure sensors 10 which are supported on the support 23. The drive 4' is connected pivotably to the hinge strap 2 via a crank lever 20 serving as the transmission element.

If a force is exerted manually on the vehicle door (not illustrated) and therefore on the hinge strap 2, then the latter uses the crank lever 20 to press against the drive 4' which presses the torque converter bearing 24 against one of the two pressure sensors 10. The corresponding sensor 10 then produces a signal which is fed via electric lines 11 to the control device (not illustrated) which then—depending on which of the two sensors produces a control signal—closes or further opens the vehicle door.

List of Reference Numbers

1 Tailgate, vehicle door
2 Hinge strap
3 Roof support
4,4' Drive
5 Electric motor, motor
6,6',6" Gear assembly
7 Spindle drive
8 Transmission element, part
9 Axis
10 Load sensor, force sensor, extension sensor, torque sensor, pressure sensor
11 Line
12 Control device
13 Line
14 Arrow
15 Switch
16 Spindle, part
17 Spindle nut, part
18 Coupling
19 Brake
20 Crank lever, transmission element, part
21 Line
22 Line
23 Support
24 Torque converter bearing

What is claimed is:

1. A motor vehicle having an automatically actuable vehicle door (1), in a side door or a tailgate of the motor vehicle, having a control device (12) and having a drive (4; 4'), which comprises a motor (5) with a gear assembly (6) connected downstream and at least one transmission element (8; 20) arranged between the gear assembly (6) and the vehicle door (1), characterized in that the drive (4; 4') comprises at least one load sensor (10) which, at a predetermined loading of the open vehicle door (1), produces a control signal which is fed to the electronic control device (12) for further processing.

2. The motor vehicle as claimed in claim 1, characterized in that the motor (5) is operatively connected to the control device (12) in such a manner that, after a control signal is produced by the load sensor (10), the control device (12) activates the motor (5) and the vehicle door (1) is automatically closed or opened.

3. The motor vehicle as claimed in claim 1, characterized in that at least one coupling (18) is arranged between the motor (5) and the transmission element (8; 20) of the drive (4; 4'), and in that the coupling (18) is operatively connected to the control device (12) in such a manner that, after a control signal is produced by the load sensor (10), the elements of the drive (4; 4') on the motor side are decoupled from the elements of the drive (4; 4') on the transmission element side, so that the vehicle door (1) can be actuated manually.

4. The motor vehicle as claimed in claim 1, characterized in that the load sensor (10) is a force or torque sensor.

5. The motor vehicle as claimed in claim 4, characterized in that the force or torque sensor (10) is a piezo sensor or optical deformation sensor.

6. The motor vehicle as claimed in claim 1, characterized in that the drive (4) comprises a spindle drive (7), a rotation of a spindle (16) brought about by the motor (5) causing an axial displacement of a spindle nut (17) which, for its part, uses the transmission element (8) to bring about a pivoting of at least one of the hinge straps (2) of the vehicle door (1), and in that the force sensor (10) is fastened to the transmission element (8).

* * * * *